(12) United States Patent
Gagnon

(10) Patent No.: US 6,199,639 B1
(45) Date of Patent: Mar. 13, 2001

(54) HILLING SPADE

(75) Inventor: Gerald Gagnon, Grand Falls (CA)

(73) Assignee: Gagnon Ornamental Works Ltd., Grand Falls (CA)

(*) Notice: Subject to any disclaimer, the term of this patent is extended or adjusted under 35 U.S.C. 154(b) by 0 days.

(21) Appl. No.: 09/299,913

(22) Filed: Apr. 28, 1999

(51) Int. Cl.[7] .................................................. A01B 15/00
(52) U.S. Cl. ............................ 172/760; 172/770; 172/771
(58) Field of Search .................................. 172/722, 754, 172/757, 758, 759, 760, 765, 768, 770, 771; 37/366, 272, 273, 279, 283

(56) References Cited

U.S. PATENT DOCUMENTS

| | | |
|---|---|---|
| 284,820 | 9/1883 | Coleman . |
| 338,054 | 3/1886 | Felder . |
| 415,409 * | 11/1889 | Dykes ................................ 172/760 |
| 626,095 * | 5/1899 | Reed .................................. 172/760 |
| 823,951 | 6/1906 | Lohrke . |
| 947,083 * | 1/1910 | Perry ................................. 172/760 |
| 1,101,149 | 6/1914 | Schoener . |
| 1,103,770 | 7/1914 | Hogan . |
| 1,194,166 | 8/1916 | Gaines . |
| 1,231,701 | 7/1917 | Bruninga . |
| 1,384,924 | 7/1921 | Schultz . |
| 2,002,751 * | 5/1935 | Nordstrom ......................... 172/760 |
| 2,046,234 | 6/1936 | Austin ................................... 55/306 |
| 2,096,766 | 10/1937 | Self ....................................... 97/129 |
| 2,784,507 | 3/1957 | Kinsinger .............................. 37/98 |
| 3,517,752 | 6/1970 | Glee .................................. 172/721 |
| 3,718,103 | 2/1973 | Orthman ............................ 172/159 |
| 4,207,952 * | 6/1980 | Van Natta ......................... 172/754 |
| 4,834,189 | 5/1989 | Peterson et al. .................. 172/166 |
| 4,984,638 * | 1/1991 | Coste ............................. 172/760 X |
| 5,984,017 * | 11/1999 | Packham ................................ 172/1 |

FOREIGN PATENT DOCUMENTS

| | | | |
|---|---|---|---|
| 154781 | 3/1914 | (CA) . | |
| 438851 * | 12/1926 | (DE) ................................... 172/760 |
| 701181 * | 1/1931 | (FR) ................................... 172/760 |

OTHER PUBLICATIONS

"The Potato"—Third Edition (Title) by W.G. Burton. (Author) pp. 274,311 and 517 1989 (Date).

"The Potato Crop, The Scientific Basis for Improvement" (Title) Edited by P.M. Harris (Editor) pp. 319–320, 360, 507–508, 572–573 1978 (Date).

Biggi Giovanni, patent figures, p. 1, Sep. 1980.*

* cited by examiner

Primary Examiner—Victor Batson
(74) Attorney, Agent, or Firm—Mario Theriault

(57) ABSTRACT

A hilling spade according to the present invention has a pair of moldboards or wings defining a plowing angle having a pointed forward end. Each wing has a central planar surface, a cutting edge, and a lower curved surface between the cutting edge and the central planar surface. The lower curved surface has a curvature oriented vertically inwardly relative to the plowing angle. Each wing also has an upper curved surface having a curvature oriented vertically outwardly relative to the plowing angle. When the hilling spade is used for hilling ridges along rows of plants, the lower curved surfaces are usable for lapping lower portions of the ridges for compacting the lower portions and for reducing erosion of these ridges. The upper curved surfaces are usable for pushing soil over the ridges and under the foliage of the plants on those ridges without damaging the foliage.

20 Claims, 4 Drawing Sheets

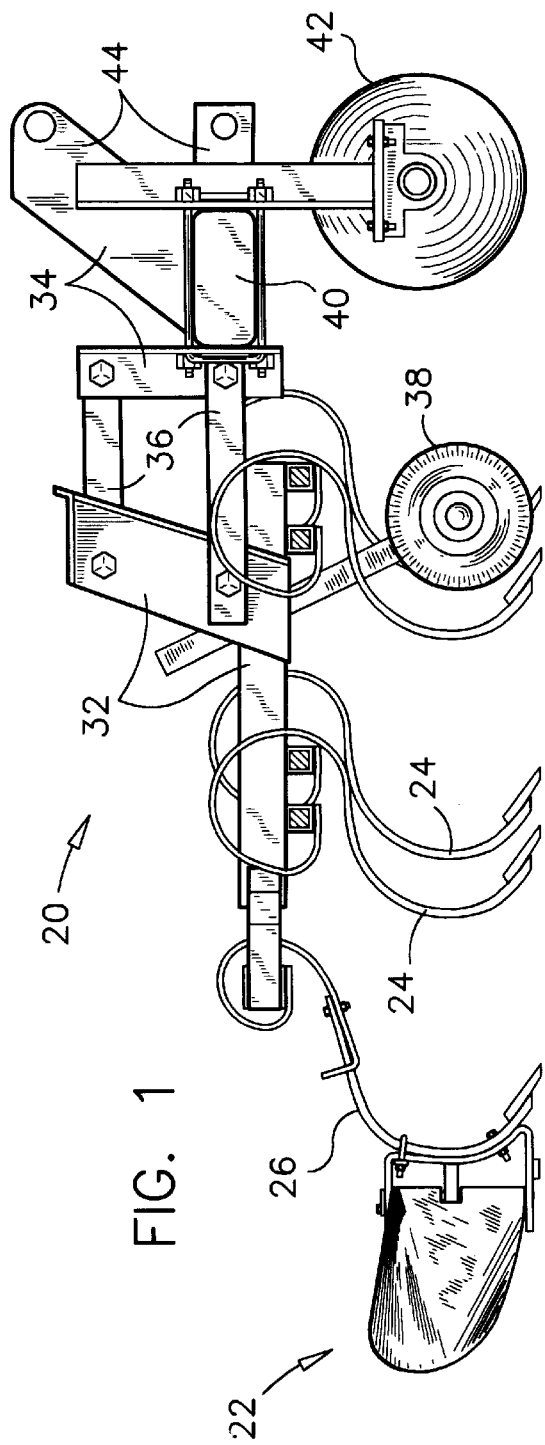
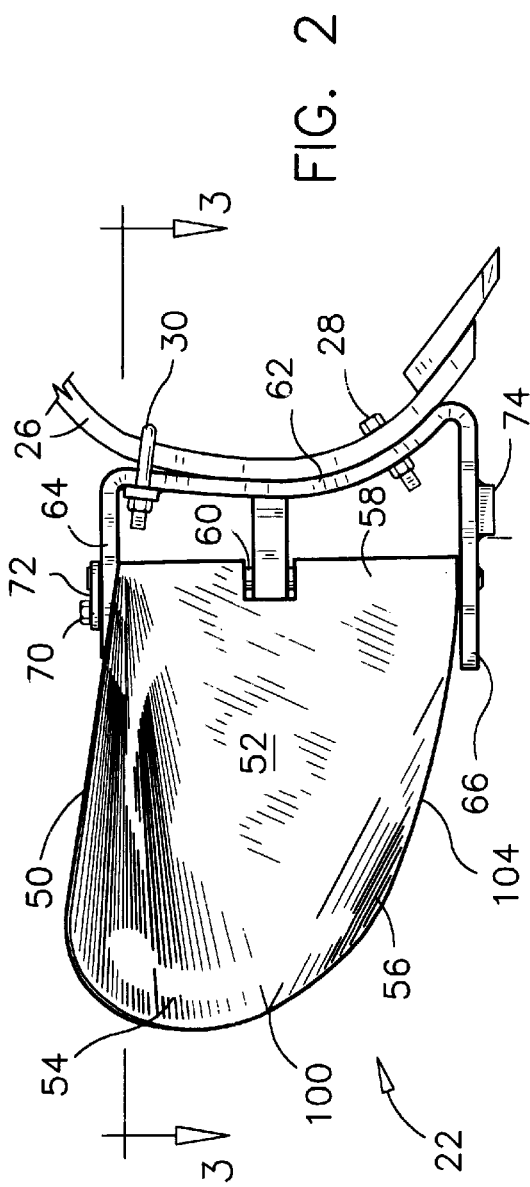
FIG. 1
FIG. 2

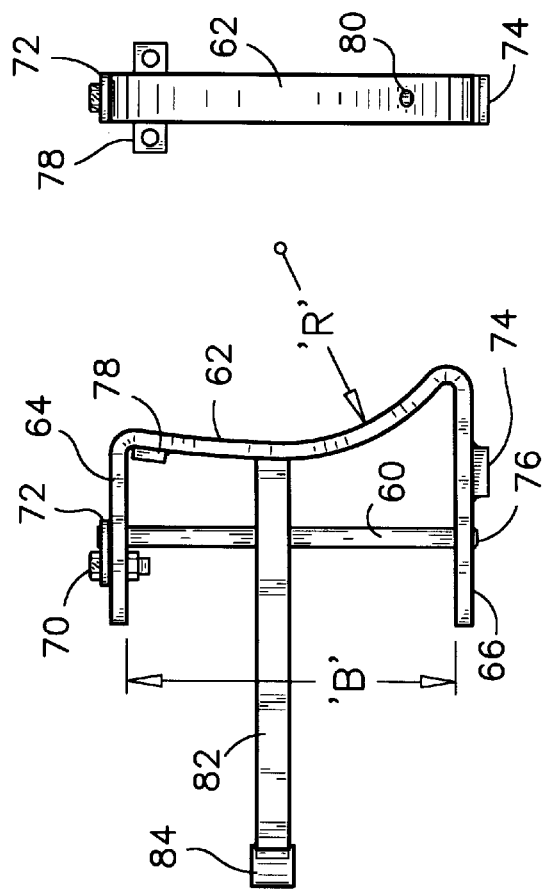
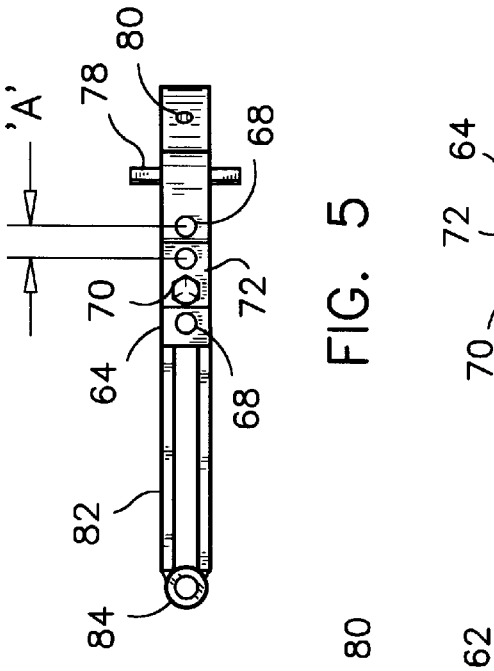
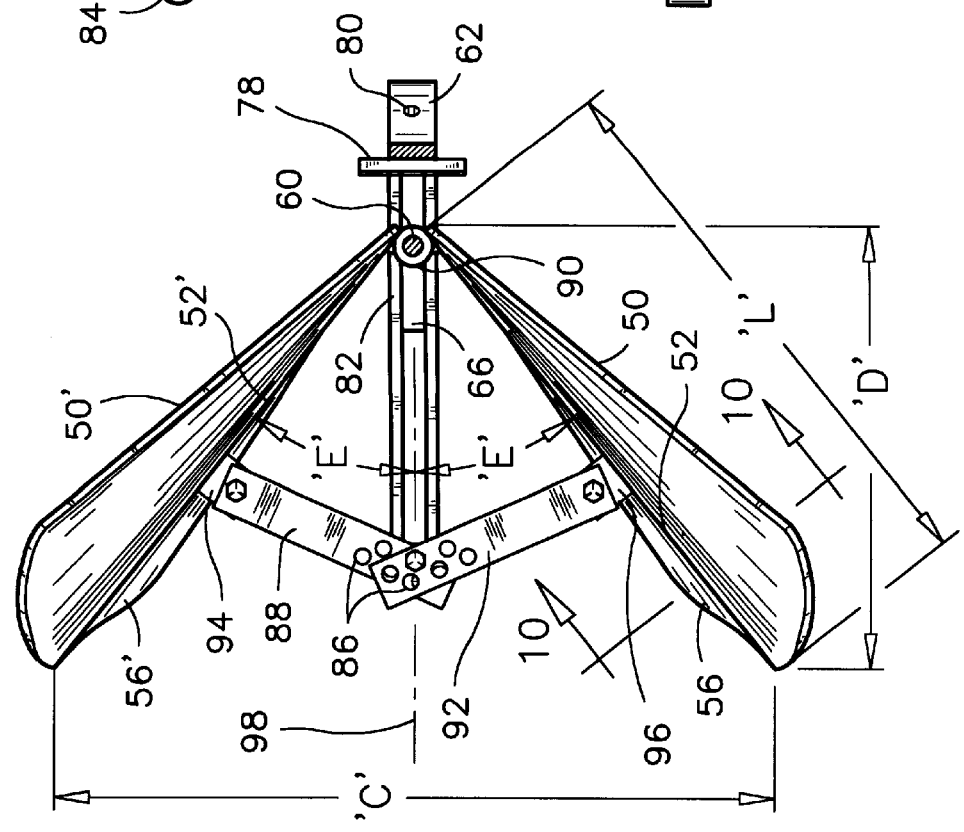

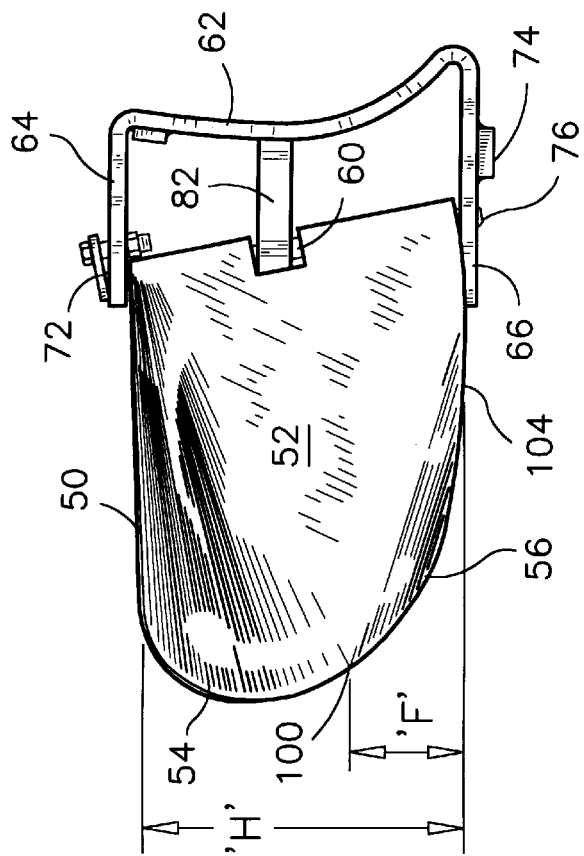
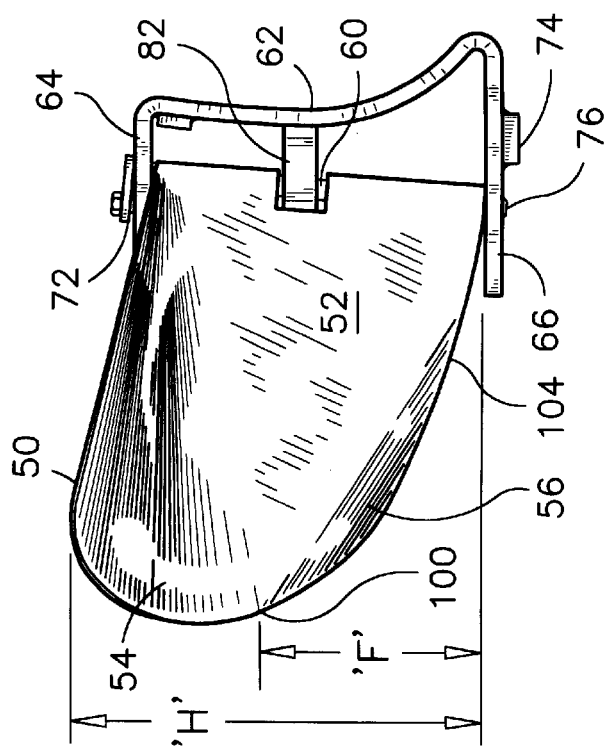

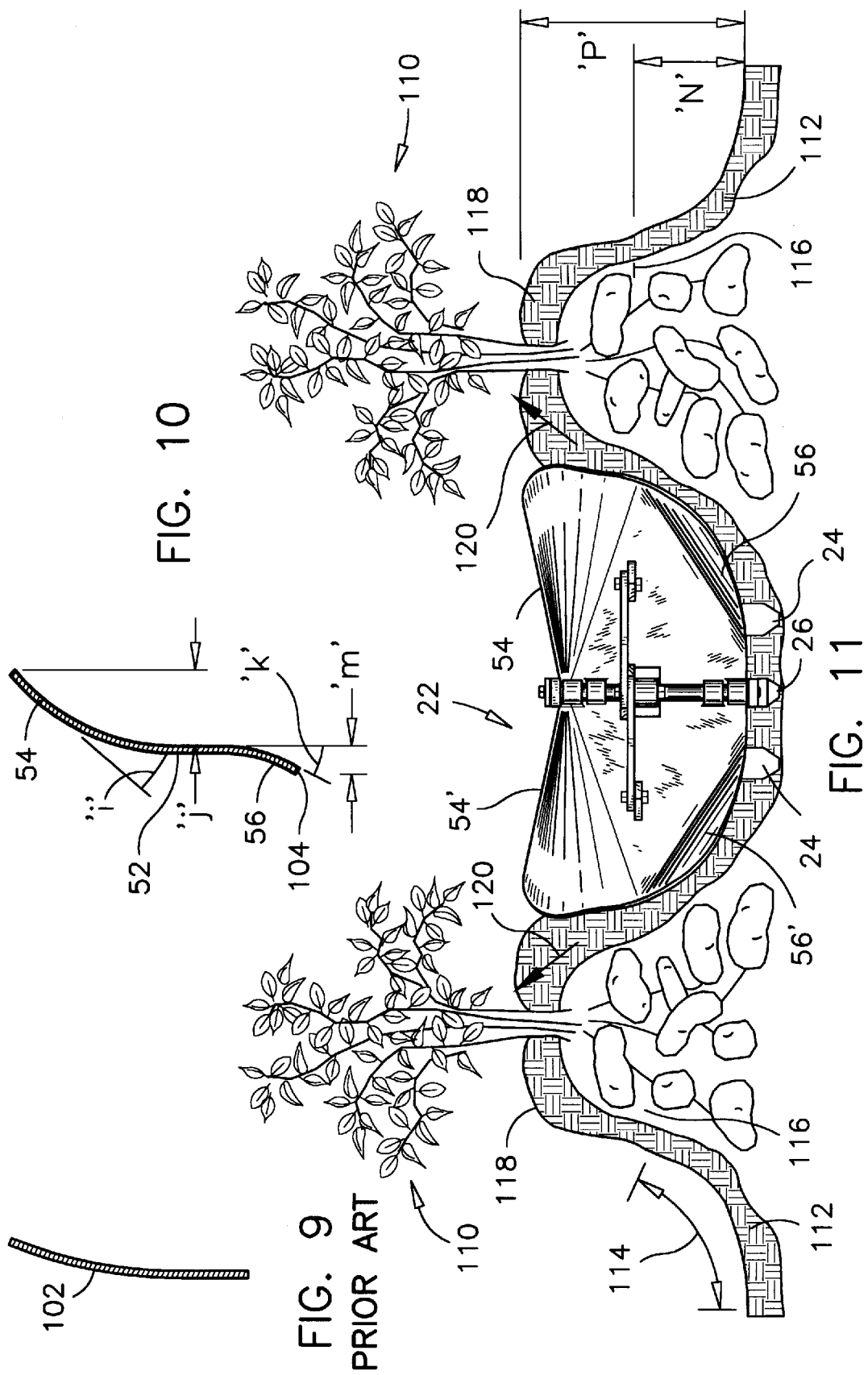

HILLING SPADE

FIELD OF THE INVENTION

The present invention pertains to agricultural hoeing and hilling implements and more particularly, it pertains to a hilling spade that has soil-compacting features.

BACKGROUND OF THE INVENTION

The greening of potatoes is a quality problem that causes substantial losses to growers every year. This phenomenon has been the subject of numerous studies and publications, and is better explained in the following references.

In a first publication entitled: "The Potato, Third Edition" by W. G. Burton, pp. 274, 311 and 517, (1989), the author explains that if potatoes are exposed to light they develop chlorophyll, particularly in the peripheral layers thereof. This can happen when, for example, the tubers protrude out of the row, or are insufficiently covered by soil. The author also explains that the greening reduces the acceptability of the product on the market, and because of the parallel development of solanidine, greened potatoes are sometimes bitter when cooked. Moreover, the reference also teaches that the effect is not merely cosmetic or flavour, greened potatoes can be unfit for consumption because of a high content of glycoalkaloids.

In a second reference entitled: "The Potato Crop, The Scientific Basis For Improvement", edited by P. M. Harris, pp. 319–320, 360, 507–508, 572–573, (1978), the editor explains that the major cause of greening is insufficient cover over the tubers when the tubers form near the soil surface. The reference also suggests that the incidence of greening is caused mainly by tuber variety, stem density, the size of seeds planted and ridge size and construction.

The ridging of potato rows is normally effected after planting, when the foliage is well deployed and the tubers start to develop. This operation is normally carried out with conventional hilling implements that have not changed greatly over the years.

In this regard, a multiplicity of hoeing and hilling implements have been developed in the past for hilling potatoes. A first example of a conventional machine for hoeing potatoes is illustrated in Canadian Patent No. 154,781, issued in 1914 to C. A. Hayden. The hoeing portion of the machine comprises a pair of moldboards that are set diagonally to one another and are adapted to be drawn over a ridge of potatoes, one on either side of the ridge. In use, the moldboards scrape the soil between the ridges and move this soil over the side and top portions of the ridge between the moldboards.

In another example, the U.S. Pat. No. 1,103,770, issued on Jul. 14, 1914 to P. E. Hogan illustrates and describes a single moldboard implement. This device has a shovel-like tooth that is adapted to loosen up the soil between the ridges. When the implement is pulled between rows of cultivated plants, the shovel-like tooth loosens up the soil and the moldboard moves the loose soil laterally against the row of plants.

It may be appreciated that although these implements have undeniable merits, they are lacking the ability to compact the soil against the ridge, and therefore a newly formed ridge is susceptible to erosion.

In a third example, the U.S. Pat. No. 2,096,766, issued on Oct. 26, 1937 to G. H. Self, describes a potato hiller that has blades on the forward side of each moldboard for cutting weeds. This potato hiller also has a pair of packing plates hinged to the rear side of the moldboards for packing the soil on the sides of a row of potatoes for example. Each packing plate is urged downward by a pivoted rod and a spring.

Although the inventor of this latter potato hiller has recognized the benefit of packing soil against a ridge for preventing erosion and for protecting potatoes against sunburns and frost, this potato hiller has not enjoyed a lasting success. It is believed that the particular mounting of the packing plates is mechanically complex and is subject to wear and frequent maintenance. Further, it is believed that because each packing plate is set at or below the cutting edge of a moldboard, and makes a reflex angle with the cutting edge and with the forward side of the moldboard, the packing plates cause the implement to float over the soil, thereby reducing the ability of the moldboards to efficiently scrape and move loose soil over the ridges.

As such, it may be appreciated that there continues to be a need for a new and improved hilling spade that is capable of simultaneously scraping soil and compacting the loosened soil against a ridge of potatoes for forming a lasting cover over the potatoes in that ridge.

SUMMARY OF THE INVENTION

The present invention reduces the difficulties and disadvantages of the prior art equipment by providing a hilling spade that has a pair of moldboards or wings that are individually manufacturable from a single piece of metal plate and that have lapping segments above and contiguous with the cutting edges thereof. These lapping segments are particularly efficient for simultaneously scraping soil and compacting the soil against the bases of the ridges being formed. The ridges are thereby considerably more resistant to erosion than those formed with conventional implements.

Broadly, a hilling spa de according t o the present invention has a pair of wings set in a horizontally disposed V-shaped formation defining a plowing angle having a pointed forward end. Each wing has a central planar surface, a cutting edge and a lower surface between the cutting edge and the central planar surface. The lower surface has a curvature oriented vertically inwardly relative to the plowing angle.

When the hilling spade is used for ridging rows of plants, the lower curved surfaces are usable for lapping the lower portions of adjacent ridges, for compacting the lower portions and for reducing erosion of these ridges.

In another feature of the present invention, the lapping segment of each wing makes an acute angle with the central planar surface of that wing such that these segments do not apply any significant upward lifting forces on the wings and do not hinder their abilities to scrape soil and form ridges.

In yet another feature of the present invention, the wings of the hilling spade are adjustable vertically for lapping a more or less wider portion of each ridge. This feature is particularly appreciable for ridging a variety of crop plants and rows having different spacings.

In yet a further feature of the present invention, each wing has an upper curved surface having a lower edge contiguous with the central planar surface of the wing and an upper curvature oriented vertically outwardly relative to the plowing angle. The curvature of this upper surface is also an acute angle relative to the central planar surface, and projects outwardly a distance of about at least three inches from the central planar surface. The upper curved surfaces on the wings of the hilling spade are particularly advantageous for pushing loose soil over the ridges being formed and under the foliage of the plants on these ridges without damaging the foliage.

Still another feature of the present invention is that it is susceptible of a low cost of manufacture with regard to both materials and labour, and which accordingly is then susceptible of low prices of sale to retailers, thereby making such hilling spade economically available to the growers.

BRIEF DESCRIPTION OF THE DRAWINGS

One embodiment of this invention is illustrated in the accompanying drawings, in which like numerals denote like parts throughout the several views, and in which:

FIG. 1 is a side view of an agricultural cultivator on which the hilling spade according to the preferred embodiment is mountable;

FIG. 2 is a side view of the hilling spade according to the preferred embodiment;

FIG. 3 is a top view of the hilling spade as seen along line 3—3 in FIG. 2;

FIG. 4 is a side view of the saddle member in the hilling spade according to the preferred embodiment;

FIG. 5 is a top view of the saddle member;

FIG. 6 is a front view of the saddle member;

FIG. 7 is a side view of the hilling spade with the wings set in their uppermost positions;

FIG. 8 is also a side view of the hilling spade according to the preferred embodiment but with the wings set in their lowermost positions;

FIG. 9 is a cross-section view of a hilling moldboard of the prior art;

FIG. 10 is a cross-section view of a wing of the hilling spade according to the preferred embodiment, as seen along line 10—10 in FIG. 3;

FIG. 11 is a partial rear view of the hilling spade according to the preferred embodiment in use.

DETAILED DESCRIPTION OF THE PREFERRED EMBODIMENT

While this invention is susceptible of embodiments in many various forms, there is shown in the drawings and will be described in details herein a specific embodiment, with the understanding that the present disclosure is to be considered as an example of the principles of the invention and is not intended to limit the invention to the embodiment illustrated.

With reference to the drawings and to FIGS. 1 and 2 in particular, an agricultural cultivator 20 on which the hilling spade 22 according to the preferred embodiment is preferably mounted comprises; a plurality of spring loaded tines 24 including a rearmost tine 26, for loosening the soil to be worked between rows of plants. The hilling spade 22 of the preferred embodiment is mounted to the rearmost tine 26 by means of a first bolt 28 through the lower end of the rearmost tine and a U-bolt 30 encircling an intermediate region of that tine 26.

The agricultural cultivator 20 also comprises a floating frame 32, a pull frame 34, and a set of link members 36 joining the floating frame to the pull frame and allowing a limited vertical movement of the floating frame 32 relative to the pull frame 34. There is also provided a depth gauge wheel 38 for supporting the floating frame 32 and controlling the depth of the tines 24,26 and of the hilling spade 22.

Several sets of floating frames 32, tines 24,26 and hilling spades 22 may be mounted side by side on a common pull beam 40 for hilling several rows of plants in one pass. The pull beam 40 preferably has at both ends thereof, a guide wheel 42 for aligning the cultivator 20 along the rows of plants to be hilled. The pull beam 40 also has attachments 44 for mounting to a farm tractor as is customary with similar agricultural implements.

Referring now particularly to FIGS. 2 and 3, there are illustrated therein a side view and a top view of the hilling spade 22 according to the preferred embodiment. The hilling spade 22 comprises two moldboards set in a V-shaped formation defining a plowing angle pointing forward relative to the use of the hilling spade. In this particular arrangement, each moldboard has a support side inside the plowing angle and a hilling side outside the plowing angle. These moldboards are referred to herein as the wings 50, 50' of the hilling spade 22.

Although only the right wing 50 of the hilling spade 22 is illustrated in FIG. 2, and in several other figures, it will be appreciated that these drawings are intended to illustrate the structure of both wings wherein the left wing 50' is a mirror image of the right wing 50.

The right wing 50 has a triangular central surface 52, an upper curved surface 54 and a lower curved surface 56, also referred to as a lapping segment. The triangular surface 52 has an isosceles shape and each curved surfaces 54,56 is contiguous with a respective longer side thereof. The upper curved surface 54 is curved outwardly relative the spade 22, and the lapping segment 56 is curved inwardly. The base 58 of the triangular area 52 is pivotally mounted to a vertical round bar 60. The round bar 60 is held to a saddle frame member 62 through horizontal top and bottom extension members 64,66 of the saddle frame member 62.

The saddle frame member 62 is better illustrated in FIGS. 3–6. The saddle frame 62 has a curved portion having a preferred radius of curvature 'R' of between about 10–12 inches to match the shape of most popular types of tines 26. The upper horizontal extension member 64 has four holes 68 therein for receiving the upper end of the round bar 60 and for retaining the round bar 60 in one of four different positions. In use, one of the four holes 68 is used to receive a bolt 70 for retaining a holed tab 72 affixed to the upper end of the round bar 60, to the upper extension member 64.

The lower horizontal extension member 66 has a single hole therein (not shown) for receiving the lower end of the round bar 60. A wear block 74 made of abrasion-resistant steel is affixed to the lower horizontal extension member 66 at proximity of the lower end 76 of the round bar 60, for protecting the lower end 76 of the round bar 60 against wear associated with the use of the hilling spade. Both wings 50, 50' are also preferably made of abrasion-resistant steel.

The spacing 'A' between the holes 68 in the upper horizontal extension member 64 is preferably about one inch, when the vertical spacing 'B' between the upper and lower horizontal extension members 64,66 is between about ten to eleven (10–11) inches. These dimensions are especially appropriate for providing the preferred longitudinal inclinations of the wings as illustrated in FIGS. 7 and 8, and as will be explained later.

A transversal member 78 has two holes therein and is mounted to the upper portion of the saddle frame 62. The transversal member 78 is used to retain a U-bolt 30 encircling the intermediate region of the rearmost tine 26 of the cultivator 20. A hole 80 in the lower region of the saddle frame 62 is used to receive the bolt 28 retaining the hilling spade 22 to the lower end of rearmost tine 26.

The saddle frame member 62 further comprises a horizontally-disposed elongated channel member 82 extending rearward thereof for laterally guiding the round bar 60.

A socket 84 is mounted at the end of the channel member 82 for anchoring a pair of lateral adjustment connectors 86,88.

As it was mentioned before, each wing is pivotally mounted to the round bar 60. Each wing is connected to the round bar 60 by means of a pair of tubular members 90 affixed to each wing and loosely enclosing the round bar 60, as partly illustrated in FIG. 3.

Each connector 86,88 has a series of holes 92 therein and is pivotally connected to a respective tab 94,96 welded to the inside surface, or support side of a respective wing. Thus the maximum width 'C' between both wings is adjustable according to the spacing between rows of plants to be hilled for example or according to the quantity of soil to be added to the rows during the hilling of these rows. The dimensions of the channel member 82, the positions of the tabs 94,96 and the lengths of the connectors 86,88 are preferably selected to provide a maximum width 'C' which is adjustable between about 17½ inches and 25½ inches.

For reference purposes, the effective length 'D' of the hilling spade 22 according to the preferred embodiment as shown in FIG. 3, is preferably about 14 inches, with the true length 'L' of each wing 50, as shown in FIGS. 3 and 7 being about 18 inches. These dimensions correspond to a preferred plowing angle, being twice the illustrated angle 'E' of between about 38° to about 40° between each wing 50,50' and a longitudinal axis 98 of the spade.

Referring now particularly to FIGS. 7–11, there are illustrated therein several important features of the hilling spade 22 according to the preferred embodiment. The preferred longitudinal inclination of the spade 22 is represented by label 'F' in FIGS. 7 and 8, and indicates the height of the apex 100 of the triangular surface 52 from the lowermost segment of the wing 50. The dimension 'F' is preferably adjustable between about 5 inches to about 7½ inches. The corresponding respective overall height 'H' of each wing is between about 11 inches and about 13½ inches.

As one will appreciate, the height of the apex 100 is generally about one half of the overall height of the spade's wing 50. This adjustment is made by varying the position of the round bar 60 in one of the four holes 68 in the upper horizontal extension member 64. The vertical adjustment of the wing 50 as just explained is provided to accommodate the hilling of plants at various stages of growth and of different varieties.

Other important dimensions of the spade wing 50 are illustrated in FIG. 10. The preferred curvature of the upper curved surface 54 at the rear end thereof, at section line 10—10 in FIG. 3, is illustrated and described using angular dimension 'i' and linear dimension 'j', and are relative to the central planar surface 52. Similarly, the preferred curvature of the lower curved surface 56, or lapping segment, is illustrated and described using angular dimension 'k' and linear dimension 'm' relative to the central planar surface 52. The preferred distances 'j' and 'm' are about three inches and one inch respectively. The preferred angular dimensions for 'i' and 'k' are between about 19° and about 21° toward the hilling side of the wing, and between about 19° and 22° toward the support side of the wing respectively.

For reference purposes, a spade wing 102 of the prior art is illustrated in FIG. 9. The spade wing 102 of the prior art does not have a lower curved surface and the curvature of the upper curved surface is not as accentuated as the upper curved surface 54 of the spade wing 50 according to the preferred embodiment.

As can be appreciated, the lapping segment 56 of the spade wing 50 is above and contiguous with the cutting edge 104 of the wing and makes an acute angle with the forward surface of the wing such that the hilling spade 22 retains its ability to effectively scrape soil between rows of plants and compact this soil against the base of the ridge being formed. The acute angle 'k' of the lapping segment 56 is particularly advantageous for effectively compacting the soil against the ridge without applying significant adverse upward forces on the hilling spade.

Referring now to FIG. 11, the operation and some of the distinct characteristics of the hilling spade 22 according to the preferred embodiment are illustrated therein. In this illustration, the hilling spade 22 according to the preferred embodiment is shown ridging rows of potato plants 110. The specific curvature of the lapping segments 56,56', the longitudinal inclination 'F', also referred to as the effective lapping height, and the plowing angle, ('E'+'E') relative to the soil surface between two rows of plants, causes each wing 50,50' to scrape and move loose soil 112 over the base portion 114 of each ridge 116 and to lap the soil over the base portion 114 of each ridge, compacting this soil against the ridge 116. This lapping and compacting action of the wings help reduce to a great extent, the erosion of the soil from the base portions of the ridges.

It has been found that the specific curvature of the upper curved surfaces 54,54', the longitudinal inclination 'H' and plowing angle ('E'+'E') relative to the soil surface between two rows of plants, cause each wing 50,50' to move new soil 118 from between the rows over the top of the ridges 116 in the direction indicated by arrows 120 against the stems of the plants without damaging the foliage of the plants 110. This feature is particularly appreciable when ridging rows of young plants for example.

As mentioned before, the ridging of plants using the hilling spade according to the preferred embodiment produces compacted surfaces at the base of each ridge 116. The height 'N' of the compacted surfaces at the base of each ridge is about half the total height 'P' of the hilled ridge. The compaction of the base portion of each ridge has been found to contribute greatly to retaining the moved soil over the base and the upper portion of the ridge, thereby providing a durable cover over tubers in that ridge for protecting these tubers from sunburns and frost.

Other advantages of the hilling spade according to the preferred embodiment comprise the fact that each spade wing 50 is manufacturable in a single piece of metal plate and is formable in a conventional machine shop brake.

As to additional details related to the manufacturing, installation and operation of the present invention, the same should be apparent from the above description, and accordingly further discussion relative to the manner of making, installing and using the hilling spade is not provided.

While one embodiment of the present invention and adjustment therefor have been illustrated and described herein above, it will be appreciated by those skilled in the art that various modifications, alternate constructions, alternate mounting arrangements and equivalents may be employed without departing from the true spirit and scope of the invention.

For example, it will be appreciated by those knowledgeable in the field of agricultural machinery that a possible variation for the hilling spade according to the preferred embodiment comprises a pair of wings as described hereinabove, but oriented to define a plowing angle pointing rearward and wherein the support side and hilling side of each wing are shifted relative to the plowing angle and to hilling spade according to the preferred embodiment. This type of mounting arrangement is illustrated in the previously-mentioned prior art implement of C. A. Hayden, and may be seen in several modern equipment used for planting a variety of crops. Although this variation has not been illustrated, it is considered to be part of the inventive concept described herein. Therefore, the above description and illustrations should not be construed as limiting the scope of the invention which is defined by the appended claims.

I claim:

1. A moldboard for attachment to a hilling implement, comprising;

a hilling side, a support side, a central planar surface, a cutting edge, a lower surface between said cutting edge and said central surface, and an upper surface having a lower edge contiguous with said central surface and an upper curvature oriented toward said hilling side; said lower surface having an upper edge contiguous with said central surface and a lower curvature oriented away from said hilling side;

such that when said moldboard is mounted to a hilling implement and is used for hilling a ridge along a row of plants, said lower surface is usable for lapping a lower portion of said ridge for compacting said lower portion and for reducing erosion of said ridge.

2. The moldboard as claimed in claim 1, wherein said lower surface makes an acute angle with said central surface.

3. The moldboard as claimed in claim 2, further having a vertical height, and said lower surface has an effective lapping height of about half said vertical height.

4. The moldboard as claimed in claim 1, wherein said lower surface projects away from said central surface a distance of about one inch.

5. A hilling spade for hilling ridges along rows of plants, comprising:

a pair of wings set in a horizontally disposed V-shaped formation defining a plowing angle having a pointed end indicating a forward direction;

each of said wings having a central planar surface, a cutting edge, a lower surface between said cutting edge and said central planar surface and an upper surface having a lower edge contiguous with said central planar surface; said lower surface having a lower curvature oriented vertically inwardly relative to said plowing angle, and said upper surface having an upper curvature oriented vertically outwardly relative to said plowing angle;

such that when said pair of wings are used for hilling ridges along rows of plants, said lower surfaces are usable for lapping lower portions of said ridges for compacting said lower portions for reducing erosion of said ridges.

6. The hilling spade as claimed in claim 5, wherein said lower surface makes an acute angle with said central planar surface.

7. The hilling spade as claimed in claim 6, wherein said acute angle is between about 19 degrees and about 22 degrees.

8. The hilling spade as claimed in claim 6, wherein said lower surface projects away from said central planar surface, a distance of about one inch.

9. The hilling spade as claimed in claim 6, wherein said upper surface projects away from said central planar surface, a distance of about 3 inches.

10. The hilling spade as claimed in claim 3, wherein said lower surface has an effective lapping height of between about 5 inches and about 7½ inches.

11. The hilling spade as claimed in claim 10, wherein said plowing angle is between about 76 degrees and about 80 degrees.

12. The hilling spade as claimed in claim 11, wherein each said wing has a length of about 18 inches.

13. The hilling spade as claimed in claim 11, further comprising means for adjusting said plowing angle.

14. The hilling spade as claimed in claim 10, further comprising means for adjusting said effective lapping height.

15. The hilling spade as claimed in claim 5, wherein each said wing has a vertical height, and said lower surface has an effective lapping height of about half said vertical height.

16. A hilling spade for hilling ridges along rows of plants, comprising:

a pair of wings set in a horizontally disposed V-shaped formation defining a plowing angle having a pointed end indicating a forward direction;

each of said wings having a central isosceles triangular planar surface having a vertically oriented base, an upper side, a lower side, and an apex indicating a rearward direction;

each of said wings also having a lower curved surface having an upper edge contiguous with said lower side of said triangular planar surface and a lower curvature oriented vertically inwardly relative to said plowing angle;

each of said wings further having an upper curved surface having a lower edge contiguous with said upper side of said triangular planar surface and an upper curvature oriented vertically outwardly relative to said plowing angle;

such that when said pair of wings are used for hilling ridges along rows of plants, said lower curved surfaces are usable for lapping lower portions of said ridges for compacting said lower portions and for reducing erosion of said ridges, and said upper curved surfaces are usable for pushing soil over upper portions of said ridges without damaging foliage of plants on said ridges.

17. The hilling spade as claimed in claim 16, wherein each of said wings has a cutting edge, and said lower curved surface lies between said cutting edge and said triangular planar surface, and said lower curved surface makes an acute angle with said triangular planar surface.

18. The hilling spade as claimed in claim 17, further comprising a saddle frame having means for attachment thereof to a cultivator tine.

19. The hilling spade as claimed in claim 18, wherein said saddle frame comprises a curved portion and said curved portion has a radius of curvature of between about 10 inches and about 12 inches.

20. The hilling spade as claimed in claim 19, wherein each of said wings is pivotally mounted to a round bar and said round bar is removably affixed to said saddle frame.

* * * * *